3,349,072
POLYETHYLENE PROCESS
Richard L. Alexander, Orange, Tex., Harold D. Lyons, Overland Park, Kans., and Francis E. Brown and Russell A. Long, Orange, Tex., assignors to Gulf Oil Corporation, Pittsburgh, Pa., a corporation of Pennsylvania
No Drawing. Filed Apr. 5, 1966, Ser. No. 540,185
16 Claims. (Cl. 260—94.9)

This application is a continuation-in-part of our copending application Ser. No. 320,617, filed Nov. 1, 1963, which is a copending continuation-in-part of our application Ser. No. 240,419, filed Nov. 27, 1962, now abandoned.

This invention relates to an improved ethylene polymerization process, to polyethylene resins so obtained and to films produced from such resins. More particularly, the invention relates to a process for preparing polyethylene resins which are especially useful in fabricating films having a substantially improved combination of strength and optical properties, to resins prepared by such a process and to films fabricated from such resins.

Polyethylene films fabricated from resins prepared by the high-pressure, free-radical initiated ethylene polymerization process have gained wide commercial acceptance in a variety of applications, particularly as packaging materials. Such packaging films should have both high strength and good optical properties. However, this desired combination of strength and optical properties has been very difficult to achieve by the methods heretofore available. Films fabricated from resins prepared under polymerization conditions known to enhance the film strength properties generally have undesirable optical properties and vice versa.

The optical properties of film are ordinarily defined by the "gloss," "haze" and "transparency" values of the film. These values indicated, respectively, how well the film reflects light, the extent to which a transmitted light beam deviates from the incident beam by forward scattering and the extent to which an image-forming light beam which is transmitted through the film is distorted or spread and absorbed.

The strength properties of film are ordinarily defined by the machine direction ("MD"), and transverse direction ("TD") tear strengths of the film. These properties indicate, respectively, the force required to tear the film lines parallel to and transverse to the direction in which the film was extruded. In addition, indications of the resistance of the film to failure under severe environmental conditions and high stress, and the resistance of the film to brittle failure at low temperature are furnished by, respectively, the "stress crack resistance" and "low temperature brittleness" of the resin from which the film is made.

In general it is desired that films have optical properties of high gloss, low haze and high transparency and strength properties of high and balanced MD and TD tear strengths, high resistance to stress cracking and high resistance to brittle failure at low temperatures. In addition, when the film has unusually high transparency, it is also desired that the film be essentially free of "background," e.g., internal irregularities which are not readily apparent in a film having low transparency. A description of the tests which are used to establish these properties will appear later.

We have now discovered a particular set of polymerization conditions which enable one to prepare resins which can be fabricated into films having the combination of both substantially improved strength properties and superior optical properties.

Thus, according to our invention these high quality film-grade resins are prepared in the so-called "high pressure," free radical initiated, continuous polyethylene process by polymerizing an ethylene feed stream in a polymerization zone which is substantially free of accumulated deposits of polyethylene, while maintaining an environment of low energy level, low chain-growth rate and high free radical concentration within the portion of said zone where the bulk of the chain-propagation and chain-growth occurs.

We have furthermore discovered that the aforesaid polymerization conditions can be achieved by initially cleaning the polymerization zone of accumulated deposits of polyethylene, employing a free radical generating polymerization initiator having a relatively short half-life, maintaining within the polymerization zone a relatively high concentration of certain moderately active polymerization inhibitors, maintaining a pressure within said zone not substantially exceeding 17,500 p.s.i.g., e.g., not in excess of 18,500 p.s.i.g., and maintaining an initiation temperature (as hereinafter defined) in said zone not substantially exceeding 365° F. If any of these conditions is not satisfied then film fabricated from the resin so produced will be deficient in either strength properties or optical properties or both.

We now turn to a more detailed discussion of the invention and its relation to the processes of the prior art.

In the conventional practice of the continuous, high pressure, free radical initiated polyethylene process an ethylene feed stream is contacted with a free radical generating polymerization initiator in a polymerization zone at a polymerizing pressure, generally above 10,000 p.s.i.g. and typically above 18,000 p.s.i.g., and at a polymerizing initiation temperature (hereinafter defined) generally above 200° F. and typically above 300° F. The polymerization mixture comprising polyethylene and unpolymerized ethylene is continuously withdrawn from the polymerization zone at a rate substantially equal to the ethylene feed rate and the polyethylene product is recovered and unreacted ethylene gas is recycled to the polymerization zone.

The free radical generating polymerization initiators employed in the practice of our invention have relatively short half-lives. Thus, suitable initiators which may be employed have half-lives of from about 5 to about 50 minutes and desirably from about 20 to about 40 minutes at 185° F. as determined by the method of Doehnert and Mageli, Modern Plastics 36, 142 (February 1959). For example, Table A lists several of the initiators which are preferred in the practice of our invention.

TABLE A

| Initiator: | Half-life at 185° F., min. |
|---|---|
| Lauroyl peroxide | 30 |
| Decanoyl peroxide | 30 |
| Caprylyl peroxide | 30 |
| Tertiarybutylperoxypivalate | 25–30 |
| α,α'-Azobisisobutyronitrile | 40 |

In contrast to the initiators employed in the practice of the present invention, initiators such as ditertiarybutyl peroxide, tertiarybutyl peracetate and tertiarybutyl perbenzoate which are commonly employed in the prior art processes, have a half-life at 212° F. of 218 hours, 18 hours and 17 hours, respectively.

The initiators employed herein are introduced into the polymerization zone in a conventional manner, for example, by dissolving the initiator in a suitable solvent and injecting the initiator solution directly into the polymerization zone.

Since the polymerization reaction is exothermic, a temperature gradient will ordinarily exist within the polymerization zone with generally lower temperatures prevailing at a point of initial contact between the ethylene feed stream and the polymerization initiator and with generally higher temperatures prevailing downstream from that point. After a short induction time the polymerization of the ethylene feed begins and the bulk of the chain-propagation and chain-growth occurs within a relatively well-defined portion of the polymerization zone which for convenience will be termed herein as the "high molecular weight zone" as any chain initiated within this zone is likely to become a high-molecular weight molecule. The lowest temperature within the high-molecular weight zone is defined herein as the "initiation temperature."

We have discovered that the desired environment within the high molecular weight zone can be in part achieved by maintaining a polymerizing initiation temperature which does not substantially exceed 365° F. In general the highest temperature within the high molecular weight zone will not exceed the initiation temperature by more than about 30–35° F. The control of initiation temperature is advantageously accomplished by adjusting the ratio of initiator to ethylene feed injected into the polymerization zone.

Another process parameter which significantly affects the environment in the high molecular weight zone is the pressure. As previously mentioned, it is desired to maintain an environment of low energy level, low chain growth rate and high free radical concentration in the high molecular weight zone. However, it is now known that unless certain precautions are observed, such environment is conducive to production of certain undesirable molecular species which actually detract from film optical properties. The production of these undesirable species can be eliminated or at least significantly minimized by limiting the time of residence of polymer chains in an area of high free radical concentration.

We previously disclosed in our copending application Ser. No. 320,617 that the pressure should not substantially exceed about 17,500 p.s.i.g. and examples were presented showing the depreciation in film optical properties resulting from excessive operating pressures of 19,000 and 21,000 p.s.i.g. Subsequent research has now demonstrated that the operating pressure can be maintained at the very limit of the range previously contemplated if the net space velocity is adjusted to reduce the dwell-time of the propagating polymer chains in the area of high free radical concentration. The reduced dwell-time partially compensates for the increased tendency toward production of undesired molecular species induced by the higher operating pressure. Thus, by increasing the ethylene feed rate we have found it is possible to operate just below the 19,000–21,000 p.s.i.g. excessive pressure range and still maintain the desired combination of strength and optical properties. Thus, the polymerization pressure should not exceed 18,500 p.s.i.g., and will typically be maintained at between about 16,500 to 18,500 p.s.i.g., desirably 18,000 to 18,500 p.s.i.g.

According to an important feature of the process of our invention, the polymerization of the ethylene feed stream is carried out in the presence of a relatively high concentration of a polymerization inhibitor of the type hereafter described.

We have found that only those inhibitors which have only a moderate polymerization inhibiting effect under the net space velocity conditions encountered in the polymerization zone are successively employed in our invention. If the polymerization inhibiting effect of the inhibitor is too great, the polymerization reaction will be "killed" or terminated by the introduction of sufficient inhibitor to cause the desired improvement in properties of films made from the resins so produced.

The polymerization inhibitors employed in our invention are nuclearly-substituted phenols, biphenols, and bisphenols wherein each phenolic nucleus has at least one substituent selected from the class consisting of hydroxy, carboxyl, carbonyl, nitro, amino, aminoloweralkyl, loweralkylamino, lower alkyl, lower alkenyl, lower alkoxy and lower alkacyl groups. Such an inhibitor may be employed alone or in mixture with one or more other inhibitors of this type.

Especially desirable results are obtained when the substituents on the phenolic nucleus are lower alkyl groups of up to four carbon atoms, especially methyl, isopropyl and tertiarybutyl, lower alkenyl groups of up to four carbon atoms, especially vinyl, α-methyl-substituted vinyl, and allyl groups, lower alkoxy groups having up to three carbon atoms, especially methoxy groups, and hydroxy groups.

In the case of the bisphenols it appears that the groups linking the phenolic nucleii can be of widely diverse types. We have found the thiobisphenols, loweralkenylenebisphenols such as methylene and ethylene bisphenols, and loweralkenylenebisphenols such as ethenylene and propenylenebisphenols are particularly useful.

In general one achieve better results by utilizing polymerization inhibitors of the type above-described which have at least two and preferably three or more substituents on each phenolic nucleus. Thus, while compounds such as Parahydroxybenzaldehyde,
Hydroquinone monomethyl ether,
Styrene,
α-Methyl styrene, and
p-Amino phenol, are useful, it is more desirable to utilize compounds such as the xylenols, especially 3,5-xylenol,
2,6-diisopropyl phenol,
3,5-ditertiarybuyl-4-hydroxy benzyl ether,
1,3,5-trimethyl-2,4,6-tris(3,5-ditertiarybutyl-4-hydroxy benzyl) benzene,
2,6-dioctadecyl-paracresol,
2-tertiarybutyl hydroxy anisole,
4-hydroxymethyl-2,6-ditertiarybutyl phenol,
4-tertiarybutyl pyrocatechol,
2,5-ditertiaryamyl hydroquinone,
2,4-bis(1,1-dimethyl-propyl phenol),
4,4'-thiobis(6-tertiarybutyl-meta-cresol),
2,2'-ethylenebis(4-methyl-6-tertiarybutyl phenol),
4,4'-methylenebis(6-tertiarybutyl-ortho-cresol),
4,4'-methylenebis(2,6-ditertiarybutyl phenol),
2,4,6-tri-tertiarybutyl phenol, and
2,6-ditertiary butyl-4-methyl phenol.

Of the inhibitors identified above it is especially advantageous to use the mononuclear phenols such as 3,5-xylenol,
2,6-ditertiary-butyl-4-methyl phenol,
2,6-ditertiarybutyl-4-ethyl-phenol, or
2-tertiarybutyl hydroxy anisole.

The compounds 2,6-ditertiarybutyl-4-methyl phenol, and
2,6-ditertiarybutyl-4-ethyl-phennol are preferred as they appear to possess the optimum combination of properties required to produce the most superior film grade resins.

It is particularly advantageous to use 2,6-ditertiarybutyl-4-ethyl-phenol as the inhibitor as it appears to produce a product which is more linear and has better color stability. Furthermore, it is easier to handle as it is a liquid which is readily soluble in common solvents.

Apparently the inhibitor plays a dual role in our process; first, as an adjuvant in maintaining the desired environment in the high molecular weight zone and, secondly, as an aid in preventing the accumulation of deposits of polyethylene throughout the polymerization zone. To effectively fulfill this dual role, it is necessary that the inhibitor be uniformly dispersed throughout the polymerization mixture at a relatively high concentration.

The inhibitor is most effectively distributed throughout the polymerization zone by injecting the inhibitor, where necessary in a suitable solvent, into the ethylene feed stream before or after compression. Alternatively, the inhibitor or solution thereof can be injected directly into the polymerization zone if efficient distribution throughout the zone can be accomplished in this manner.

The solvent for the inhibitor can be the same or a different solvent than that employed to dissolve the initiator. We have found it advantageous to employ solvents for the initiator and for the inhibitor which have a relatively low telogenating effect. For example, solvents such as aliphatic or aromatic hydrocarbons can be used.

In general, the concentration of inhibitor which must be maintained within the polymerization zone is "relatively high" in comparison to the concentration employed when compounds similar to the inhibitors are used as antioxidants. The actual amounts of any specific inhibitors employed will depend on its activity as an inhibitor but in each instance will be an effective amount, i.e., at least an amount sufficient to produce resins which are capable of fabrication into films having the combination of properties defined as "acceptable" in Table B herebelow.

It is a general characteristic of our process that a certain minimum amount of inhibitor is required to produce resins capable of fabrication into films having the acceptable combination of strength and optical properties as hereafter defined in Table B but the use of additional amounts of inhibitor leads to minimal or no improvement in properties while in some cases introducing undesirable side effects.

For example, when using 2,6-ditertiarybutyl-4-methyl phenol as the inhibitor it is necessary to introduce into the polymerization zone at least 350, desirably 300–500 and preferably at least 500 parts of the inhibitor per million parts of ethylene feed (weight basis) in order to achieve the desired combination of film properties. However, the maximum amount of this inhibitor employed should advantageously not exceed 500–600 p.p.m. of ethylene feed as no appreciable improvement in film properties is thereby achieved while initiator consumption is greatly increased.

Similar limits on inhibitor introduction rate for any specific suitable inhibtor can be established by routine experimentation by a person of ordinary skill having regard for the disclosure herein. Thus, in general, the effective amount of a suitable inhibitor of high inhibiting activity will be less than that required for a suitable inhibitor of lower inhibiting activity. For example, 3,5-xylenol, a more active inihbitor than 2,6-diteritiarybutyl-4-methyl phenol, is effective in amounts of at least 25, desirably 30 to 50, preferably at least 50 but advantageously not exceeding 60 parts per million parts by weight of ethylene feed.

Finally, in order to prepare the high quality film-grade resins of this invention, it is necessary to carry out the polymerization in a polymerization zone which is substantially free of accumulated deposits of polyethylene. This can be accomplished by initially cleaning the polymerization zone of deposits of polymer and then maintaining the relatively high concentration of inhibitor within the zone as hereinbefore described during the conduct of the polymerization process. Although we do not wish to be bound by this mechanism, we believe that polymer which remains within the polymerization zone for a significantly longer time than the product resin is of a fundamentally different nature. Apparently this accumulated polymer is abraided during the course of the polymerization process and causes minute irregularities within film produced from the resin. These irregularities, called "microgels," impart a grainy appearance to the film and undesirably affect the "transparency" and "background" of the film.

From the preceding discussion, it should be apparent that to achieve the desired environment for producing high quality film-grade resins in the manner aforedescribed, it is necessary to maintain a very fine balance between all of the variables or parameters discussed, e.g., pressure, temperature, initiator half-life, inhibitor activity and concentration, and polymerization zone cleanliness. Thus, if one departs significantly from the teachings herein with respect to any one of these parameters, then the quality of the film which can be obtained from the resin so produced is thereby reduced in one or more respects.

In the following examples unless otherwise indicated all film properties are measured on 5 inch lay-flat tubular blown films which are produced under identical conditions on a 1 inch "NRM" laboratory extruder.

The "haze" of the film is measured in conformity with the relevant portions of A.S.T.M. Method D1003–59T, "Haze and Luminous Transmittance of Transparent Plastics." A low "haze" value is desired.

The "gloss" measurements are made in conformity with A.S.T.M. Method D523–53T, "Specular Gloss," with the exception that a 60° gloss head is used for all samples tested. A high "gloss" value is desired.

The "transparency" measurements are made in conformance to A.S.T.M. Method D146–60T, "Transparency of Plastic Sheeting." A high "transparency" value is desired. We have found that when the "transparency" of the film is quite high, it is necessary to employ an additional descriptive property of the film in order to compare subtle differences in the optical quality of the films (mainly due to microgels) which are not adequately expressed by the "transparency" values. This additional descriptive property, "background," is measured by making subjective comparisons of paired samples of films and assigning to each sample an arbitrary number which expresses its optical quality in relation to other samples compared. Thus, in the following examples a "background" value of 7 indicates the film is essentially entirely free of microgels while a "background" value of 0 indicates that the film has an undesirably high number of microgels even though the "transparency" of the film is reasonably good.

The "MD" and "TD" tear strengths are measured on a standard Elmendorf tear tester employing samples having a constant 4.3 cm. tearing radius. The tear strength values are expressed in grams of force per mil of film thickness required to propagate an initially started tear through a distance of 4.3 cm.

The "tear factor" is a measure of both the magnitude of and the balance between the MD and TD tear strengths. It is calculated by the formula:

$$\text{Tear factor} = \frac{(MD^2 + TD^2)^{1/2}}{\theta}$$

where $\theta = $ arctan MD/TD or arctan TD/MD whichever is greater (expressed in degrees). A high tear factor is desired.

The "low temperature brittleness" of the resins produced in the following examples is measured by the method of A.S.T.M. Method D746–59T and is expressed as percent failures at a temperature of −63° C. A low percentage of failures is desired.

The "stress crack resistance" tests are performed in conformity to A.S.T.M. Method D1693–60T, "Environmental Stress Cracking of Type I, Ethylene Plastics," and is expressed as the number of hours for 50% failures. A high number of hours is desired.

In each of the following examples, ethylene feed under pressure and at a temperature of about 100° F. is continuously introduced through a feed inlet into the top of a stirred polymerization reactor. The polymerization initiator is continuously introduced into the reactor and mixed with the ethylene feed at a point adjacent to the feed inlet.

A thermocouple positioned at the confluence of the feed and initiator streams measures the "initiation temperature" (hereinbefore defined). The initiation temperature is controlled by regulating the ratio of initiator to feed.

When employed the polymerization inhibitor is either introduced directly into the reactor where it is dispersed by the stirrer or it is mixed with the feed prior to its introduction into the reactor.

The polymerization mixture comprising polyethylene and unpolymerized ethylene is withdrawn from the bottom of the reactor through a "let-down" valve at a rate substantially equal to the ethylene feed rate. The pressure within the reactor is controlled by regulating the pressure drop across the let-down valve. The polyethylene is separated and recovered from the polymerization mixture and unpolymerized ethylene is recycled to the feed inlet.

By polymerizing ethylene in accordance with our invention, one can obtain resins and films fabricated therefrom having the combination of properties indicated in Table B. The "acceptable" values are obtained by maintaining all process parameters within their respective ranges as hereinbefore defined but with one or more of the variables at the extremes of their ranges. The "desired" values are obtained by maintaining all variables at the optimum values within their respective ranges.

TABLE B

|  | Acceptable | Desired |
|---|---|---|
| Film Properties: |  |  |
| Tear Factor | 5.5 | 6.5 |
| Gloss | 110 | 120 |
| Haze | 4.5 | 4.0 |
| Transparency | 65 | 75 |
| Background | 5 | 7 |
| Resin Properties: |  |  |
| Low Temperature Brittleness | 0 | 0 |
| Stress Crack Resistance | 200 | 300 |

Example I

This example illustrates the preparation of polyethylene in accordance with our invention wherein all process variables are maintained at the optimum value within their respective ranges and wherein the preferred polymerization initiator and polymerization inhibitor are employed.

The polymerization initiator, decanoyl peroxide, is continuously injected into the reactor at a rate sufficient to maintain an intiation temperature of 325° F. The inhibitor, 2,6-ditertiarybutyl-4-methyl phenol, is continuously introduced into and thoroughly dispersed within the reactor at a rate of 500 parts by weight per million parts of ethylene feed. The pressure within the reactor is maintained at 17,000 p.s.i.g. Prior to beginning the run at the conditions aforesaid the reactor is free of any substantial accumulation of deposited polyethylene.

The polyethylene resin so produced and film fabricated therefrom exhibit the following properties:

TABLE I

Film properties:
Tear factor ----------------------------- 6.7
Gloss ----------------------------- 125
Haze ----------------------------- 3.8
Transparency ----------------------------- 77
Background ----------------------------- 7
Resin properties:
Low temperature brittleness ----------------------------- 0
Stress crack resistance ----------------------------- >336

The properties of the resin produced in this run and the film fabricated therefrom in each respect are better than the desired properties defined in Table B above.

Example II

This example illustrates the effect of introducing a polymerization inhibitor into the reactor.

Three runs are made at conditions identical to the conditions of Example I except that the rate of introduction of 2,6 ditertiarybutyl-4-methyl phenol is varied. The properties of the resins so produced and the films fabricated therefrom are:

TABLE II

|  | Run 1 | Run 2 | Run 3 |
|---|---|---|---|
| Inhibitor rate, p.p.m. by weight of ethylene feed | 0 | 200 | 1,020 |
| Film Properties: |  |  |  |
| Tear Factor | 6.2 | 5.6 | 6.1 |
| Gloss | 77 | 93 | 121 |
| Haze | 9.5 | 5.8 | 3.7 |
| Transparency | 8 | 49 | 75 |
| Resin Properties: |  |  |  |
| Low Temperature Brittleness | 0 | 0 | 0 |
| Stress Crack Resistance | 32+ | 59 | 330 |

Note that in Run 1 and Run 2 the optical properties of the film and the stress crack resistance of the resin are considerably poorer than those defined as acceptable in Table B. Run 3 demonstrates that the introduction of polymerization inhibitor at a rate considerably in excess of that employed in Example I does not cause any significant improvement in the optical properties of the film and the stress crack resistance of the resin over that obtained in Example I.

Example III

This example illustrates the effect of reactor operating pressure upon the properties of the resins and the films. Two runs are made at conditions which would produce acceptable resins and films as defined in Table B above except that the pressure in the reactor is outside the limits defined hereinabove. The properties of the resins so produced and the films made therefrom are:

TABLE III

|  | Run 1 | Run 2 |
|---|---|---|
| Pressure, p.s.i.g | 19,000 | 21,000 |
| Film Properties: |  |  |
| Tear Factor | 2.0 | 2.9 |
| Gloss | 36 | 32 |
| Haze | 30.7 | 12 |
| Transparency | 2 | 27 |
| Resin Properties: |  |  |
| Low Temperature Brittleness | 10 | 0 |
| Stress Crack Resistance | 0.5 | 0.8 |

In each respect the properties of the resins and the films obtained therefrom in Runs 1 and 2 are much poorer than the acceptable properties defined in Table B above.

Example IV

This example illustrates the effect of employing an undesirably high initiation temperature.

A run is made at conditions which would yield resins and films having acceptable properties as defined in Table B above except that the initiation temperature is 385° F. The properties of the resin so produced and the film made therefrom are:

TABLE IV

Film properties:
Tear factor ----------------------------- 4.9
Gloss ----------------------------- 91
Haze ----------------------------- 5.6
Transparency ----------------------------- 55
Resin properties:
Low temperature brittleness ----------------------------- 0
Stress crack resistance ----------------------------- 336

Each of the properties of the film fabricated from the resin obtained in this run is significantly poorer than the acceptable properties defined in Table B above.

Example V

This example illustrates the effect of using an initiator having an undesirably long half-life.

Two runs are made at conditions identical to Example I with the following exceptions:

(a) The initiator employed is tertiarybutyl peracetate,
(b) The use of a long half-life initiator makes it necessary to employ initiation temperatures in excess of 365° F. in order to maintain the polymerization reaction,
(c) The inhibitor introduction rate is varied.

The properties of the resins so produced and the films made therefrom are:

TABLE V

|  | Run 1 | Run 2 |
|---|---|---|
| Initiation temperature, ° F | 418 | 418 |
| Inhibitor rate, p.p.m. by weight of ethylene feed | 0 | 225 |
| Film Properties: | | |
| Tear Factor | 2.1 | 2.7 |
| Gloss | 52 | 66 |
| Haze | 17.2 | 11.9 |
| Transparency | 3 | 7 |
| Resin Properties: | | |
| Low Temperature Brittleness | 0 | 0 |
| Stress Crack Resistance | 0.5 | 0.3 |

The strength and optical properties of the film and the stress crack resistance of the resins produced in Runs 1 and 2 are significantly poorer than those defined as acceptable in Table B above. The introduction of inhibitor into the reactor does not to any significant degree prevent the depreciation in film and resin properties caused by the use of a long half-life initiator.

*Example VI*

This example illustrates the effect of carrying out the polymerization process in a reactor which contains accumulated deposits of polyethylene.

Two runs are made at conditions identical to those in Example I except that the reactor contains substantial accumulations of deposits of polyethylene on the agitator and reactor walls which are not removed prior to the start of the run and except that the inhibitor rate is varied within its operable range. The properties of the resins so produced and the films fabricated therefrom are:

TABLE VI

|  | Run 1 | Run 2 |
|---|---|---|
| Inhibitor rate, p.p.m. by weight of ethylene feed | 260 | 510 |
| Transparency | 63 | 67 |
| Background | 0 | 2 |
| All other properties of film and resin | (¹) | (²) |

¹ At least "acceptable" (see Table B).
² At least "desirable" (see Table B).

In each run the background of the film is highly undesirable. The transparency is less than "acceptable" (see Table B) in Run 1 and is only barely "acceptable" in Run 2. If the reactor is not clean at the beginning of the run, it is not possible to attain the "desired" combination of properties (see Table B) by introducing a polymerization inhibitor as in Example I.

*Example VII*

The procedure of Example I is repeated except that the following different inhibitors are substituted in the amounts indicated for the 2,6-ditertiarybutyl-4-methyl phenol used in Example I.

| Inhibitor | Quantity, parts per million parts of ethylene feed, weight basis |
|---|---|
| 2,6-ditertiarybutyl-4-ethyl phenol | 265 |
| 4,4'-methylenebis(2,6-ditertiarybutyl phenol) | 245 |

The properties of the films prepared from the resins so produced and the properties of such resins are all at least acceptable as defined in Table I.

*Example VIII*

This example illustrates the preparation of polyethylene in accordance with our invention wherein all process variables except the pressure are continuously maintained at their optimum values within their respective ranges, wherein the prefered polymerization initiator and polymerization inhibitor are employed, and wherein the pressure is maintained near the extreme upper limit of the range hereinbefore contemplated.

The procedures of Example I are repeated with conditions identical to the conditions of Example I except that the pressure is maintained at 18,200 p.s.i.g. and the ethylene feed rate is 18,000 lb./hr. rather than 8,000 lb./hr. as in Example I. The properties of the resins so produced and the films fabricated therefrom are:

TABLE VIII

| Gloss | 123. |
|---|---|
| Haze | 4.6. |
| Transparency | 78. |
| All other film and resin properties | At least "desirable" (see Table B). |

The techniques described herein with reference to the production of ethylene homopolymer resins are similarly applicable to processes for the preparation of copolymers of ethylene and other copolymerizable organic monomers, especially in the preparation of copolymers of ethylene and alkyl acrylates by the techniques described in copending application Ser. No. 165,451, filed Jan. 10, 1962. In such processes the presence of the inhibitor, e.g., 2,6-ditertiarybutyl-4-methyl phenol prevents explosive decompositions in the course of the copolymerization reaction as well as exerting similar beneficial effects on the properties of the resins so produced.

Having fully described our invention and the preferred practice thereof, we claim:

1. In a continuous process for preparing polymers of ethylene by contacting an ethylene-containing feed stream in a polymerization zone with a free radical generating polymerization initiator at a polymerizing temperature and pressure, the improvement comprising:
  (a) carrying out the polymerization in a polymerization zone which is substantially free of accumulated deposits of polyethylene;
  (b) employing a free radical generating polymerization initiator having a half-life at 185° F. or from 5 to 50 minutes;
  (c) maintaining a pressure in said zone which does not exceed 18,500 p.s.i.g.;
  (d) maintaining an initiation temperature in said zone which does not substantially exceed 365° F.;
  (e) introducing into said zone at least one polymerization inhibitor selected from the class consisting of nuclearly substituted phenols, biphenols and bisphenols wherein each phenolic nucleus has at least one substituent selected from the class consisting of hydroxy, carboxyl, carbonyl, nitro, amino, aminoloweralkyl, loweralkylamino, lower alkyl, lower alkenyl, lower alkoxy and lower alkacyl groups, said inhibitor being introduced into said zone in at least an amount sufficient to produce polyethylene resins which are capable of fabrication into films having a tear factor of at least 5.5, a gloss of at least 110, a haze of less than 4.5, a transparency of at least 65, a background of at least 5, a low temperature brittleness of 0, and a stress crack resistance of at least 200.

2. Process of claim 1 wherein said pressure is maintained at between 16,500–18,500 p.s.i.g.

3. Process of claim 1 wherein said initiator has a half-life at 185° F. of from 20 to 40 minutes.

4. Process of claim 1 wherein said pressure is maintained within the range 18,000–18,500 p.s.i.g.

5. Process of claim 1 wherein said initiation temperature is maintained within the range 325° F. to 355° F.

6. In a continuous process for preparing film grade polyethylene by contacting an ethylene feed stream in a polymerization zone with a free radical generating polymerization initiator at a temperature above 200° F. and a pressure above 10,000 p.s.i.g., the improvement comprising:
(a) continuously introducing ethylene into a stirred autoclave reactor that has been previously cleaned of any substantial accumulations of deposited polyethylene;
(b) adjusting the pressure of said ethylene within the reactor to at least about 17,000 p.s.i.g.;
(c) adjusting the temperature of said ethylene within the reactor to at least about 300° F.;
(d) introducing into the reactor a free radical generating polymerization initiator to initiate the polymerization of the ethylene;
(e) continuously withdrawing polyethylene and unpolymerized ethylene from the reactor at substantially the rate that ethylene is introduced into the reactor;
(f) continuously maintaining the pressure within the reactor within the range of about 16,500–18,500 p.s.i.g.;
(g) continuously introducing free radical generating polymerization initiator at the rate required to maintain an initiation temperature within the range of about 325°–365° F.; and
(h) continuously introducing into the reactor and thoroughly mixing therewithin at least one polymerization inhibitor;
said polymerization initiator having a half-life of 20 to 40 minutes at 185° F. and said polymerization inhibitor being selected from the class consisting of nuclearly-substituted phenols, biphenols and bisphenols wherein each phenolic nucleus has at least one substituent selected from the class consisting of hydroxy, carboxyl, carbonyl, nitro, amino, aminoloweralkyl, loweralkylamino, lower alkyl, lower alkenyl, lower alkoxy and lower alkacyl groups, said inhibitor being introduced into said zone in at least an amount sufficient to produce polyethylene resins which are capable of fabrication into films having a tear factor of at least 5.5, a gloss of at least 110, a haze of less than 4.5, a transparency of at least 65, a background of at least 5, a low temperature brittleness of 0, and a stress crack resistance of at least 200.

7. Process of claim 6 wherein said polymerization initiator is selected from the class consisting of decanoyl peroxide, lauroyl peroxide, caprylyl peroxide, tertiary-butylperoxypivalate and $\alpha,\alpha$-azobisisobutyronitrile.

8. Process of claim 6 wherein said inhibitor is 2,6-ditertiarybutyl-4-methyl phenol.

9. Process of claim 6 wherein said inhibitor is 3,5-xylenol.

10. Process of claim 8 wherein said inhibitor is introduced into the reactor at the rate of 300–500 p.p.m. by weight of ethylene feed.

11. Process of claim 9 wherein said inhibitor is introduced into the reactor at the rate of 30–50 p.p.m. by weight of ethylene feed.

12. Process of claim 6 wherein said inhibitor is 2,6-ditertiarybutyl-4-ethyl phenol.

13. Process of claim 6 wherein said inhibitor is 4,4'-methylenebis(2,6-ditertiary butyl phenol).

14. In a continuous process for preparing film grade polyethylene by contacting an ethylene feed stream in a polymerization zone with a free radical generating polymerization initiator at a temperature above 200° F. and a pressure above 10,000 p.s.i.g., the improvement comprising:
(a) carrying out the polymerization in a stirred autoclave reactor which has been previously cleaned of any substantial accumulations of deposited polyethylene;
(b) introducing a decanoyl peroxide polymerization initiator at a rate required to maintain an initiation temperature within the range of 325–355° F.;
(c) maintaining a pressure within the reactor within the range of 16,500–18,500 p.s.i.g.; and
(d) introducing into the reactor and thoroughly mixing therewithin 300–500 parts by weight of 2,6-ditertiarybutyl-4-methyl phenol per million parts of ethylene feed.

15. Process of claim 14 wherein the 2,6-ditertiarybutyl-4-methyl phenol is replaced with about 250 parts of 2,6-ditertiarybutyl-4-ethyl phenol per million parts by weight of ethylene feed.

16. Process of claim 14 wherein the 2,6-ditertiarybutyl-4-methyl phenol is replaced with about 250 parts of 4,4'-methylenebis(2,6-ditertiarylbutyl phenol) per million parts by weight of ethylene feed.

References Cited

UNITED STATES PATENTS

| | | | |
|---|---|---|---|
| 2,566,537 | 8/1951 | Schmerling | 260—94.9 |
| 2,586,322 | 2/1952 | Franta | 260—94.9 |
| 2,964,515 | 12/1960 | Rader | 260—94.9 |
| 3,090,778 | 5/1963 | Chrlich | 260—94.9 |

JOSEPH L. SCHOFER, *Primary Examiner.*

M. B. KURTZMAN, *Assistant Examiner.*